(12) United States Patent
Canegallo (10) Patent No.: US 7,318,558 B2
(45) Date of Patent: Jan. 15, 2008

(54) DEVICES AND SYSTEMS FOR CUTTING FOOD AND PRODUCTS ORIGINALLY IN BLOCK FORM

(75) Inventor: PierOttavio Canegallo, Tortona (IT)

(73) Assignee: Dalter Alimentari S.p.A, Sant'Ilario d'Enza (IT)

( * ) Notice: Subject to any disclaimer, the term of this patent is extended or adjusted under 35 U.S.C. 154(b) by 0 days.

(21) Appl. No.: 11/003,795

(22) Filed: Dec. 3, 2004

(65) Prior Publication Data
US 2005/0160894 A1    Jul. 28, 2005

(30) Foreign Application Priority Data
Dec. 9, 2003   (IT)   .................. TO20030191 U (51) Int. Cl.
*B02C 17/02* (2006.01)
*A47J 43/00* (2006.01)
(52) U.S. Cl. ..................... 241/95; 241/169.1
(58) Field of Classification Search ........... 241/169.1, 241/168, 273.1, 273.2, 86, 88, 88.1, 91, 92, 241/273.3, 89.4, 95; 222/391; 425/313; 83/435.15, 435.19, 437.1, 437.7, 169.1, 168, 83/273.1, 273.2, 86, 88, 88.1, 91, 92, 273.3
See application file for complete search history.

(56) References Cited

U.S. PATENT DOCUMENTS 936,101 A * 10/1909 Edwards ................. 241/169.1
1,182,541 A * 5/1916 Egge ........................ 241/296
2,867,255 A * 1/1959 Berney et al. ........... 241/273.2
3,581,790 A * 6/1971 Conte ...................... 241/88.1
4,127,375 A   11/1978 Nelson ..................... 425/313
4,588,136 A * 5/1986 Homma .................... 241/95
5,221,052 A * 6/1993 Vega ........................ 241/36
6,315,224 B1 * 11/2001 Holcomb et al. ........... 241/93
6,412,717 B1 * 7/2002 Menelaou ................... 241/92

FOREIGN PATENT DOCUMENTS

CH    682714 A5    11/1993

* cited by examiner

*Primary Examiner*—Faye Francis
(74) *Attorney, Agent, or Firm*—Seed IP Law Group PLLC (57) ABSTRACT

A refillable cutting container device is described for whole block food products to be dispensed in the grated, shredded or flake form, of the type comprising: a container body suitable for receiving a food product in the form of one or more whole blocks; a cutting means of the product coupled to the container body in correspondence with the mouth thereof; and a thrusting plate of the product against the cutting tool, integral in rotation with the container body, which is suitable for engaging by screwing by means of a central hole or nut screw on an axial threaded stem being integral with the cutting tool, so as to move forward along the stem by screwing when the container body and the cutting tool are placed in relative rotation with respect to each other, by continuously pressing the product against the tool up to the substantial exhaustion thereof. The thrusting plate can have at least one slot which extends radially from the central hole so as to define an opening nut screw.

22 Claims, 5 Drawing Sheets

DEVICES AND SYSTEMS FOR CUTTING FOOD AND PRODUCTS ORIGINALLY IN BLOCK FORM

BACKGROUND OF THE INVENTION

1. Field of the Invention

The present invention relates to a cutting container device for food products, in particular hard cheese, suitable for preserving a product being available in the form of one or more whole blocks and for dispensing such product in grated, shredded or flake form.

2. Description of the Related Art

Containers are known having incorporated a grating tool, suitable for receiving a certain amount of a food product such as a hard cheese to be grated (for example parmigiano or pecorino, in the form of one or more blocks) intended for being sold as cheese packages, substantially for a disposable use.

One particular device is shown and described in Swiss patent CH 682 714 in the name of NESTLÉ, which relates to a device for dispensing a food product available in the form of a crumbly block, in particular pot-herbs in the form of compact frozen blocks.

The '714 device is made of a glass-like container body with polygonal section suitable for housing the food product to be dispensed, whose mouth is closed by a cutting tool group comprising a disk provided with cutting edges and an annular body supporting the disk being securable to the container body and suitable for rotating with respect to it in a plane perpendicular to the container body axis.

A threaded stem, integral with the disk, is oriented perpendicularly thereto so as to be axially arranged inside the container body, and a compression plate, parallel to the disk, is fit thereon and it is provided with an internally threaded central through-passing hole, with threading suitable for the stem thread.

One or more blocks of the food product to be dispensed are arranged within the glass-like container body between the compression plate and the cutting tool, and they are thrusted by the plate against the tool.

This plate is provided for screwing along the stem starting from an initial position wherein it is arranged in correspondence with the bottom of the container body, towards the mouth thereof, i.e., approaching the tool, so as to press, with continuity, one or more blocks of food against cutting edges, while this is grated. The approaching of the plate occurs by rotating the container body with respect to the base or vice versa.

Devices of this kind are typically provided for a single use. Once the contained product is finished the entire package is thrown away and a new one is bought.

It is possible to envision the above-described device in a package of the refillable type, providing the possibility of unscrewing or separating in another way the tool group from the glass-like container for setting the mouth thereof free and allowing the introduction of new blocks of product.

However, when the device has exhausted the product, it is in the configuration wherein the compression plate on the axial stem has reached a stroke end position near the tool itself, whereby when refilling it is necessary to manually "unscrew" the plate for the entire stroke, i.e., for the entire length of the stem, for the purpose of bringing it back to a starting position.

Only when the plate has been brought back to the top of the stem, or even unthreaded therefrom, is it possible to refill the device with the product.

It will be immediately understood how the "refilling" operation results thus to be very expensive, requiring much time for being brought to an end, so that it cannot be faced at the same time when the table is already set.

A further drawback of the known technique is given by the fact that in the described refilling operation, it is necessary the direct manipulation of some internal components of the device, which can be dirtied or contaminated, thus compromising the hygienic preservation of the refilling product.

BRIEF SUMMARY OF THE INVENTION

One aim of the invention is that of devising a cutting container device for food products, of the refillable type, which does not have the drawback of the known technique, i.e., which allows a simple and quick refill of the product contained thereinside, without an excessive manipulation of the parts composing the device.

To this purpose, in one embodiment, the invention is directed toward a refillable cutting container device for blocks of food products to be dispensed in the grated, shredded or flake form, comprising:

a container body suitable for receiving the food product in the form of one or more blocks;

cutting means for the food product, coupled to the container body in correspondence with the mouth thereof; and thrusting means for the food product, including a plate having a geometric shape complementary to the transverse cross-section of said container body and being arranged so as to rotate as a unit with said container body, the plate being provided with a threaded central opening for threaded engagement with a threaded stem configured to rotate with said cutting means and axially oriented within the container body, said plate being capable of moving forward along the threaded stem by screwing when the container body and the cutting means are placed in relative rotation with respect to each other, thereby continuously pressing the food product against said cutting means up to the substantial exhaustion thereof, and characterised in that said plate has at least one slot which radially extends from the central hole so as to define an opening nut screw. Particular realization modes of the invention are also appreciated by the inventor.

BRIEF DESCRIPTION OF THE SEVERAL VIEWS OF THE DRAWINGS

Further characteristics and advantages of embodiments of the invention will be shown in greater detail in the following minute description given by way of non-limiting example, with reference to the annexed drawings, wherein.

DETAILED DESCRIPTION OF THE INVENTION

With reference to the figures, two different embodiments of the device 10 (FIG. 3a), 100 (FIG. 11) subject of the invention will be now described, wherein the device is used for dispensing hard cheese or the like in the grated form, available respectively in the form of two blocks or slats, i.e., in the form of a single monolithic block being holed for the entire length along its own longitudinal axis.

Each embodiment also has two illustrated realization versions.

Figures 1A, 4A, 5A, 7A:
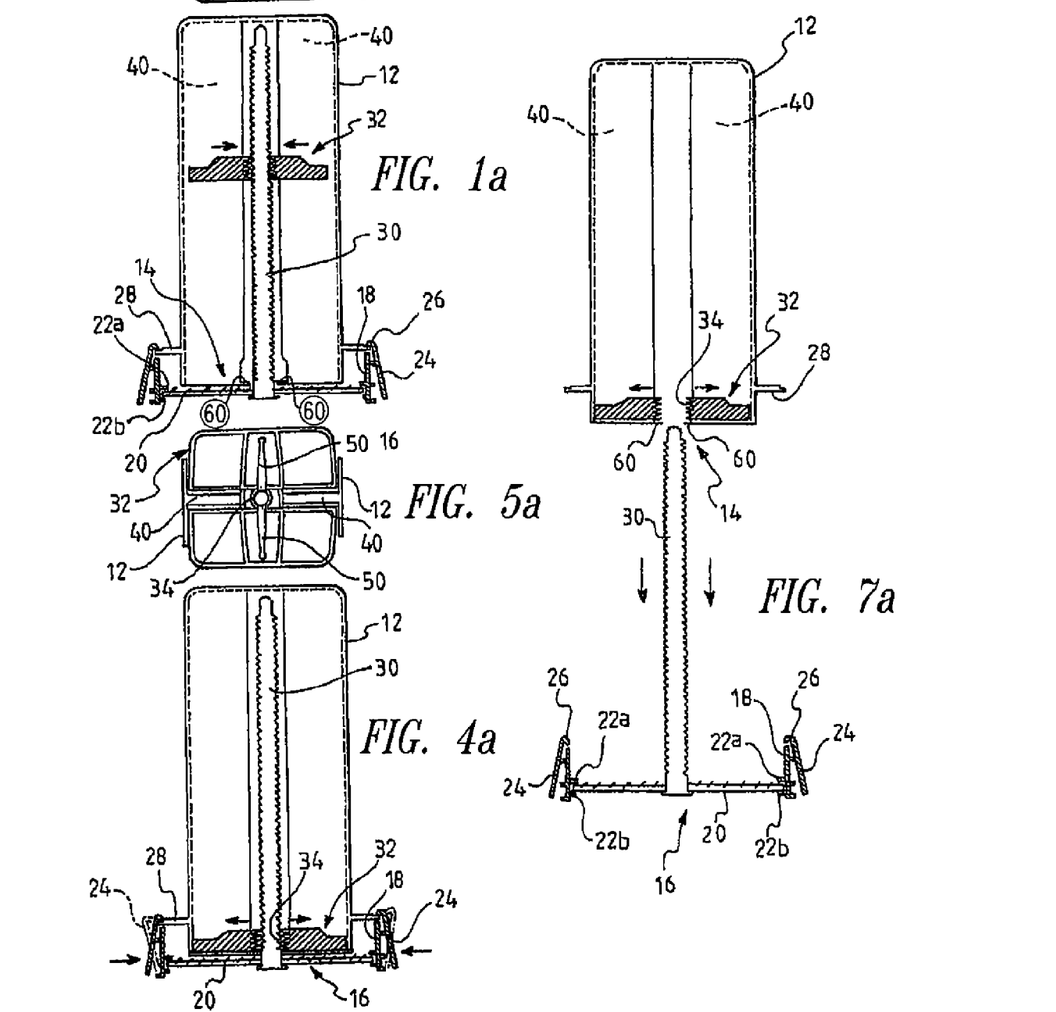
FIGS. 1a and 1b are partial longitudinal section views of a first embodiment of the device subject of the invention, according to two versions of a first embodiment, in an intermediate configuration.
FIGS. 4a and 4b are partial longitudinal section views of the two versions of the first embodiment of the device respectively, in a stroke end configuration.
FIGS. 5a and 5b are partially sectioned top views of the thrusting plate of the two versions of the first embodiment of the device, respectively, in the stroke end configuration.
FIGS. 7a and 7b are partial longitudinal section views of the devices of the two versions of the first embodiment, respectively in an opening configuration.
Figures 1B, 5B:
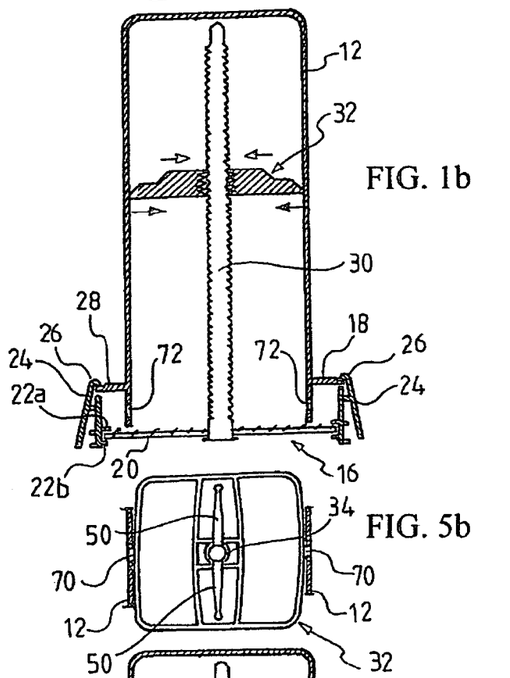

As illustrated in FIG. 1, the device 10 being subject of the invention comprises a glass-like container body 12 of plastic or other suitable material, with polygonal or other suitable cross-section, preferably square, to whose mouth a cutting tool 16 is coupled with substantially circular shape.

This latter is essentially made of an annular support 18 suitable for being associated in a removable way to the glass-like body 12 and of a disk 20 provided with cutting tools, retained by the annular support in such a position as to face its own cutting tools towards the inside of the container body 12 in an operative configuration of the device.

In detail, as best illustrated in FIG. 1a or FIG. 1b, the annular support 18 of the cutting tool has a pair of overlapped coaxial annular ribs 22a, 22b radially protruding towards the inside of the support, suitable for retaining therebetween the above disk 20.

Obviously, different solutions for assembling the cutting device 16 can be provided; for example, a single complete annular rib and a second retaining rib comprising arch-like portions of limited extension, arranged at regular intervals along the inner circumference of the support can be provided or a series of niches or notches (not shown) arranged at regular angular intervals along the circumference of the support, suitable for snappily receiving corresponding radial tabs protruding from the edge of the disk 20, easily disengageable for the substitution of a disk with another provided with cutting tools of different functionality.

Although in the following treatment only a grating tool is referred to, the device can be realised with any type of cutting tool, whereby the disk 20 can be provided with radial blades for the treatment of the product flaked in the flaked form, or with cutting edges shaped for obtaining flosses or continuous shreds.

The annular support 18 also has at least one pair of coupling oscillating tabs 24, coupled thereto and having a tooth-like end formation 26 suitable for engaging on a corresponding circular flange 28 integrally made with the glass-like container body 12, so as to obtain the closing of the mouth of the container body by means of the cutting tool.

Obviously, any other coupling and retaining system of the cutting tool 16 at the mouth of the container body 12 can be used.

A threaded stem 30, integral with the disk 20 of the cutting tool 16 in the illustrated embodiment, soars perpendicularly thereto along its axis and, in the closed configuration of the device, it extends axially for the entire length of the glass-like body 12.

On the stem 30, during operation, a thrusting plate 32 is fit suitable for thrusting the food blocks against the cutting tool 16, of form being complementary with the transverse cross-section of the container body 12, and preferably of plastic material. The plate 32 is engaged on the stem by screwing within a threaded central hole 34 (FIGS. 5a, 5b) of its own, sometimes called nut screw hereafter in the description.

The described configuration allows a translation of the plate 32 for the entire length of the threaded stem 30 when the container body 12 and the cutting tool 16 are placed in relative rotation with one another, the threaded stem being integrally made with the tool 16 and the thrusting plate being operatively integral with the container body 12 for form fitting.

In this way the plate 32 can globally translate from a starting position on the bottom of the container body 12 and at the top of the stem 30, constituting a starting configuration, once the refill has occurred, up to a stroke end position, wherein the plate is arranged near the disk of the cutting tool, in a configuration of product exhaust.

In one version of the first embodiment, the device 10 can be used for housing and grating two slats F1 and F2 of cheese (FIG. 9a), arranged at opposite parts with respect to the axial stem 30 and being separated by a pair of baffles 40 integrally made inside the container body 12 and aligned in a mean longitudinal plane (see for example FIGS. 1a, 5a, 7a, and 9a).

In this case, the plate 32 has the shape described with reference to the FIGS. 2a and 5a, i.e., it has two deep notches 42 along a mean section, forming seats for the baffles 40 in the translation of the plate along the stem 30.

According to the invention, the plate 32 also has at least a slot which extends radially starting from the central hole so as to define an opening nut screw.

Preferably in the first embodiment shown in the FIGS. 1-10, the plate 32 has a pair of slots 50, made in the mean section orthogonal to the section wherein the notches 42 are made, which extend from the peripheral edge of the plate to the central threaded hole 34, opening therein, so as to define on the plate two specular halves and to divide the central hole into two semicylindrical halves.

In correspondence with the vertex of each slot 50 near the peripheral edge of the plate 32, this latter results thinned and it defines a hinge line between the two halves of the plate, parallel to the axis of the same, for weakening of the rigid plastic structure of the plate.

The plate 32 is formed in such as way as to take a rest configuration wherein the slots 50 are wide apart in such an extent as to widen the central hole 34 setting apart from one another the two semicylindrical halves; the two halves of the plate are susceptible of approaching elastically, possibly up to rejoin themselves, in a shut configuration further to external thrusting, up to closure of the slots and to the restoration of the central hole.

In other words, in this first embodiment the central hole, or nut screw 34, is opening in two halves.

The baffles 40 of the container body 12 have, for a short longitudinal section near the mouth of the same, a reduced transversal extension, and in the plane of the mouth a pair of facing retaining tabs 60 (FIG. 7*a*), protruding towards the stem 30 with respect to the transversal extension of the baffle in the terminal section thereof.

With reference to the FIGS. 1*a*-7*a*, 8, 9*a*, 10 a procedure of use and refill of the device being subject of the invention is described hereafter.

FIG. 1*a* shows an intermediate configuration wherein the thrusting plate 32 suitable for thrusting the blocks of cheese F1, F2 against the grater-like cutting tool 16 is exactly in an intermediate position along the threaded stem 30. The blocks of cheese are not drawn for a better comprehension of the figure.

Figure 2A:
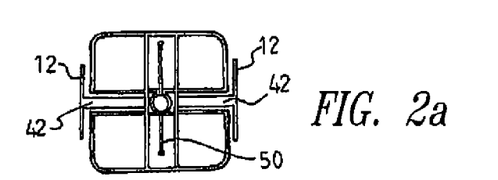
FIGS. 2a and 2b are partially sectioned top views, of a thrusting plate in the two versions of the device shown in FIGS. 1a and 1b, respectively, in the intermediate configuration.

In this configuration, as it is better understood from FIG. 2*a*, the plate 32 is shaped for interference with the walls of the container body 12 and by the introduction of the baffles 40 in the notches 42. In particular, exactly the deep introduction of the baffles 40 into the corresponding notches 42 determines the mutual approaching of the two halves of the plate separated by the slots 50 and the tightening of the central hole 34 around the threaded stem 30 with the subsequent engagement of the inner threading of the hole 34 on the threading of the stem 30.

In this configuration, each relative rotation movement between the body 12 and the cutting tool 16 causes the moving forward of the plate 32 along the threaded stem 30 by screwing.

Figure 3A:
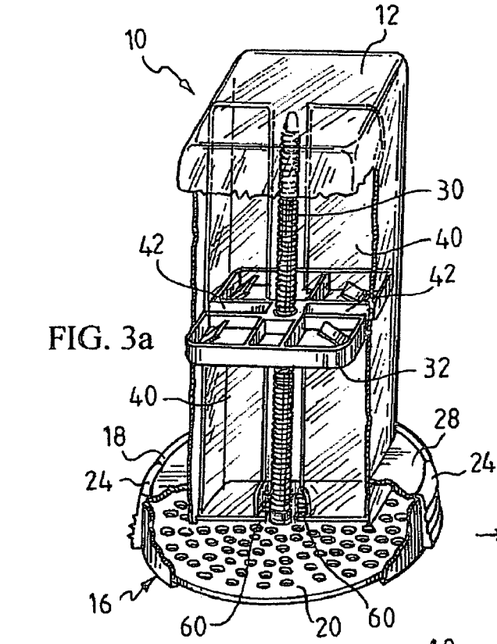
FIGS. 3a and 3b are partially sectioned perspective views of the devices in the intermediate configuration, of the two versions of FIGS. 1a and 1b, respectively.

A more detailed representation is given in FIG. 3*a* where the blocks of cheese are omitted for a better intelligibility.

Once a configuration of product exhaust is obtained, such as shown in FIG. 4*a*, the plate 32 occurs to be in a stroke end position near the grater-like disk 20.

Figure 6A:
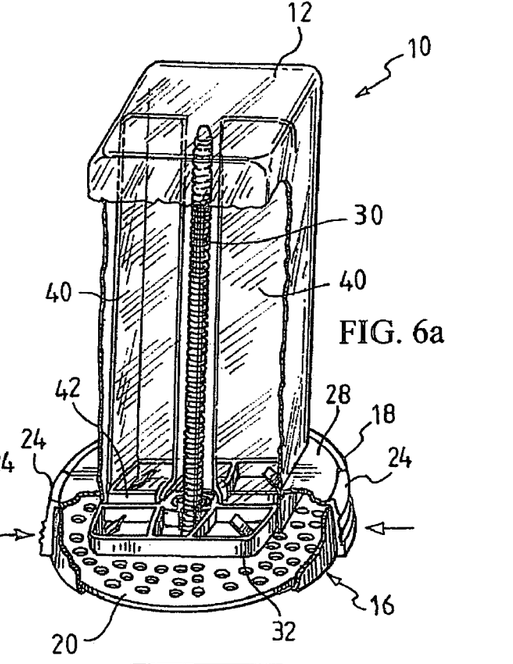
FIGS. 6a and 6b are partially sectioned perspective views of the devices in the stroke end configuration, of the two versions of the first embodiment of the FIGS. 4a and 4b, respectively.

As it is better understood in FIGS. 5*a* and 6*a*, when the plate 32 has reached its stroke end position it interacts with the baffles 40 in the section where they have a reduced radial extension, whereby they cannot be inserted deeper in the notches 42 by pressing the two halves of the plate approaching to each other, as in FIG. 2*a*, but the two halves of the plate result to be free of taking the rest configuration wherein they open wide apart opening the slots 50 and the central hole 34.

In this configuration the engagement of the threading around the central hole 34 on the stem 30 fails and, by operating the uncoupling of the tool 16 from the container body 12 by acting on the tabs 24, it is possible to open the device by separating the tool 16, which the stem 30 is integral with, from the container body, without drawing away also the plate 32, which instead retained inside the container body, near the mouth 14 thereof, by the retaining tabs 60 formed on the baffles 40.

Figure 8:
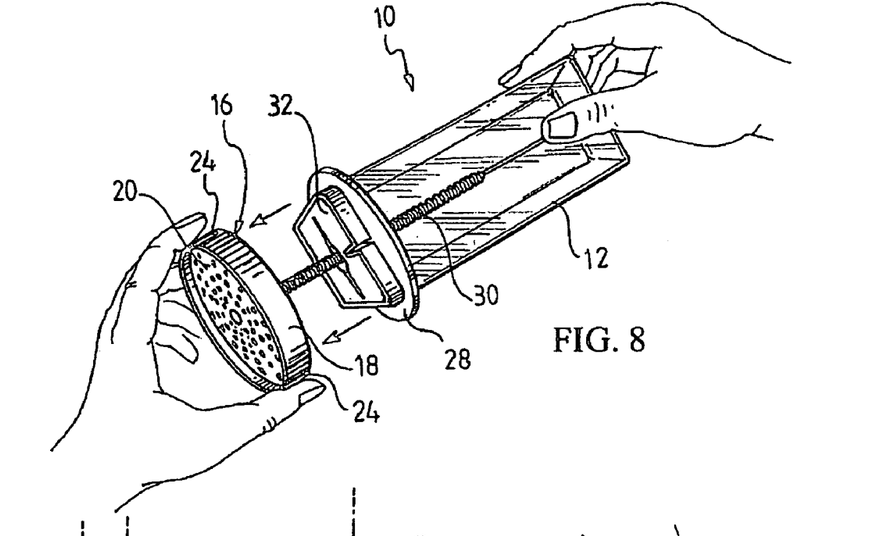
FIG. 8 is a perspective view of the device according to one of the two versions of the first embodiment, during an opening operation.

The operation can be better seen in FIG. 8.

Figures 9A, 9B:
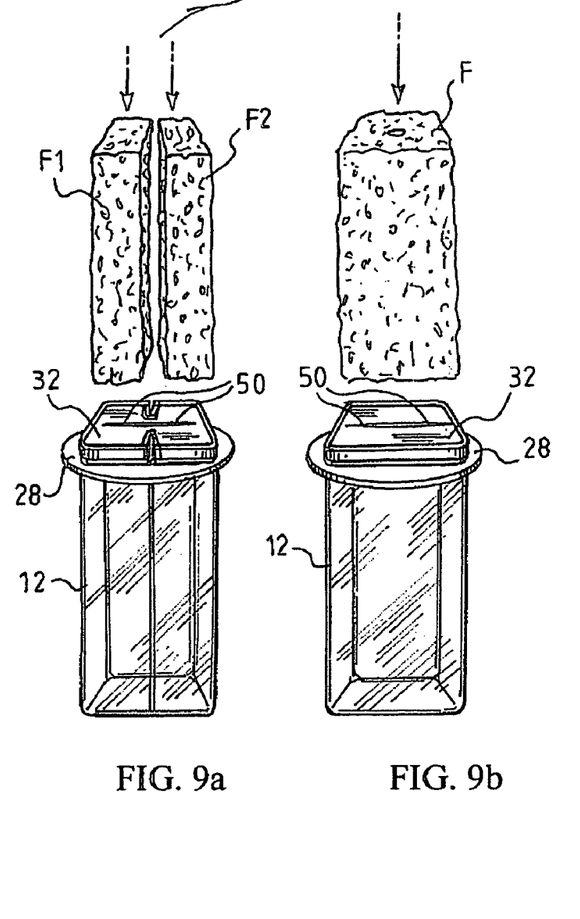
FIGS. 9a and 9b are perspective views of the devices in the two versions, respectively, during a refilling operation.
Figure 10:
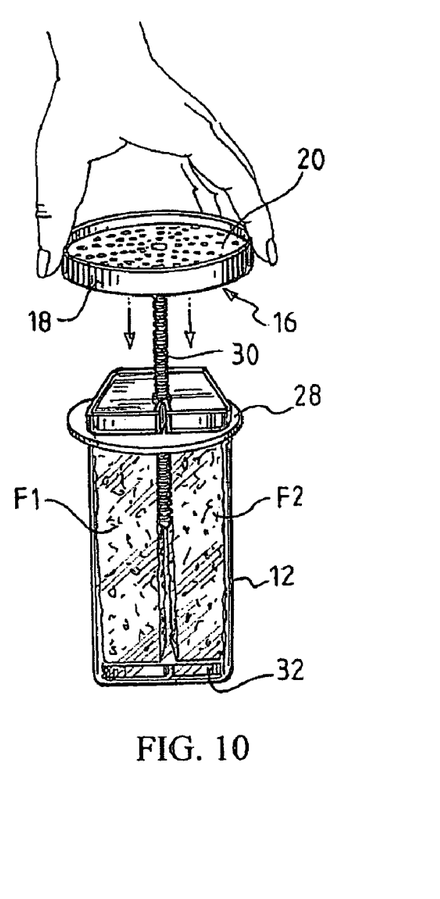
FIG. 10 is a perspective view of the device according to one of the two versions, during a closing operation once refilling has occurred.

At this point the refill of the product is possible within the container as in FIG. 9*a*. The introduction of the blocks of cheese F1, F2 determines the withdrawal of the plate 32 to the bottom of the container body 12. Thus, as shown in FIG. 10, it is possible to perform the re-closing of the device by introducing the threaded stem 30 in the suitable set between the baffles 40 for the entire extension of the container, until it is coupled, with a final screwing operation, to the plate 32 on the bottom.

Thus the cutting container device is again refilled and the grinding and subsequent dispensing of the cheese in the grated form (or, more generally, the cutting of the product) can be restarted according to the above described typical modes.

In a second version of the first embodiment the use of a similar cutting container device is provided with a single monolithic block of cheese F (FIG. 9*b*), previously holed along its own longitudinal axis for allowing the introduction of the threaded stem 30 of the tool 16.

Figure 3B:
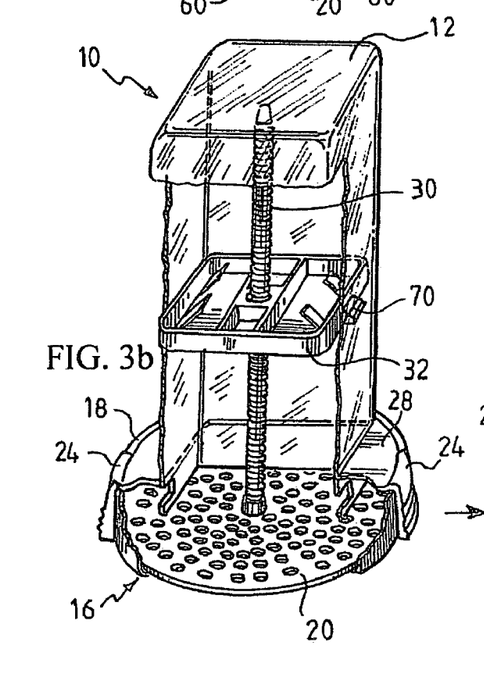

In this case, as it is noted from the previously described comparison of FIG. 1*b* with FIG. 1*a*, and even better from the comparison between FIGS. 3*b* and 3*a*, the container body 12 does not have inner baffles, and, as a consequence, the plate 32 does not have corresponding notches.

In the mean section orthogonal to the section wherein the slots 50 are made, the plate 32 is instead provided with a pair of teeth 70 (FIGS. 2*b*, 5*b*) being diametrally opposed and protruding from the peripheral edge outwards.

The container body 12 has a single space for housing the product being axially crossed by the threaded stem 30 in the assembled condition. In a transversal section near the mouth, on two opposite walls of the container body, two diametrally opposed openings 72 (FIG. 1*b*) are made, of such dimensions as to be able to receive the teeth 70 protruding from the plate.

With reference to the FIGS. 1*b*-7*b*, 9*b* the use of the device is hereafter described.

Figure 2B:
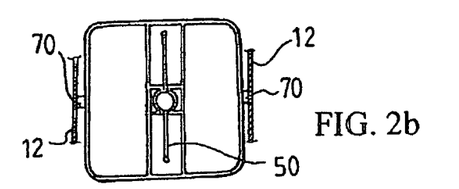

FIGS. 1*b* and 2*b* show the device in an intermediate configuration similar to the one shown in FIGS. 1*a* and 2*a*. The plate 32 thrusting the product towards the grater-like cutting tool is in an intermediate position along the threaded stem 30. The diametrally opposed teeth 70 press against the inner walls of the container body, thrusting the two halves of the approaching plate therebetween. In this configuration the shutting of the central hole 34 of the plate 32 occurs around the threaded stem 30 with the subsequent engagement of the plate on the threaded stem, whereby the plate can translate along the stem by screwing further to relative rotation between the container body and the cutting tool.

Figure 4B:
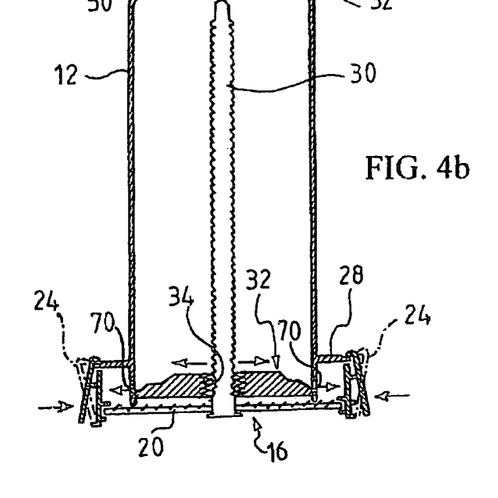
Figure 6B:
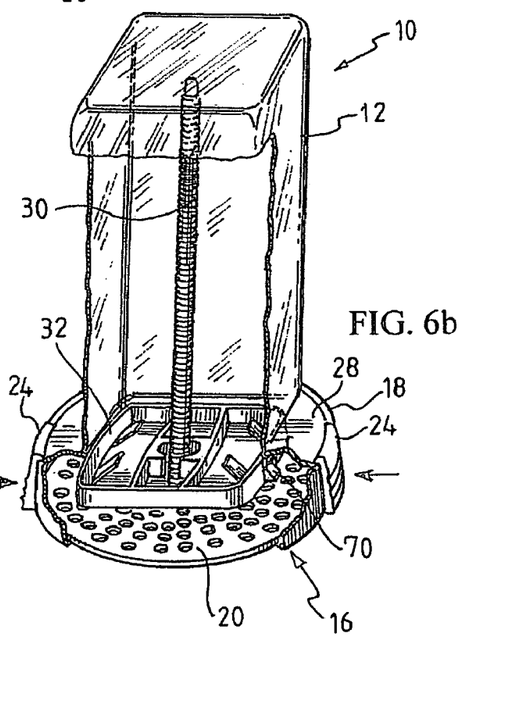
Figure 7B:
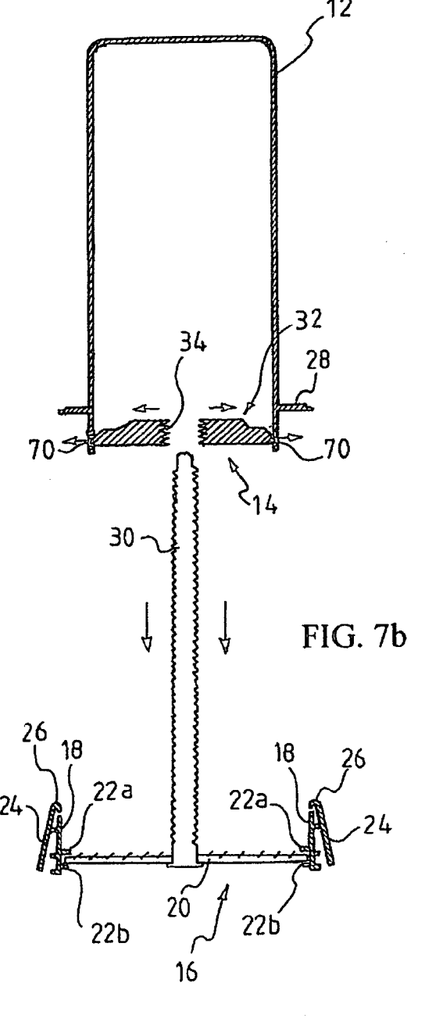

When the product to be grated finishes, the plate 32 has reached the stroke end position shown in FIGS. 4*b* and 6*b*, near the grater-like disk 20. In this configuration the teeth 70 of the plate are in correspondence with the openings 72 made on the walls of the container body and they snap shut therein by virtue of the recalling elastic force of the plate. The two halves of the plate take their own rest configuration (see FIG. 5*b*) by opening wide apart in correspondence with the central hole 34 of the plate, whereby the plate loses grip on the threaded stem 30 allowing the disassembly of the device as shown in FIG. 7*b*, which occurs as above described.

Conveniently, the teeth 70 thrusting the plate in the shut configuration, when they extend within the openings 72, allow also the retention of the plate 32 within the container body 12 when unthreading from the stem 30 consequently to the separation of the cutting tool 16 from the container body, but, as effect of the realisation of a curved prompting upper surface, they do not avoid the withdrawal of the plate within the container body during the introduction of a new block of cheese for refilling the device (FIG. 9b).

Once the refill has occurred it is possible to couple again the tool 16 to the container body 12 taking care of introducing the threaded stem 30 in the axial hole provided in the block of cheese F until it is induced to engage with the plate 32 in correspondence with the bottom of the container body.

With reference to FIGS. 11-15, a second embodiment of the cutting container device 100 is now described.

In these FIGS. 11-15, equal components and the opening, refilling and closing operations, having the same function already described, are indicated with equal reference numbers. These common components are thus not described again in detail.

Figure 15:
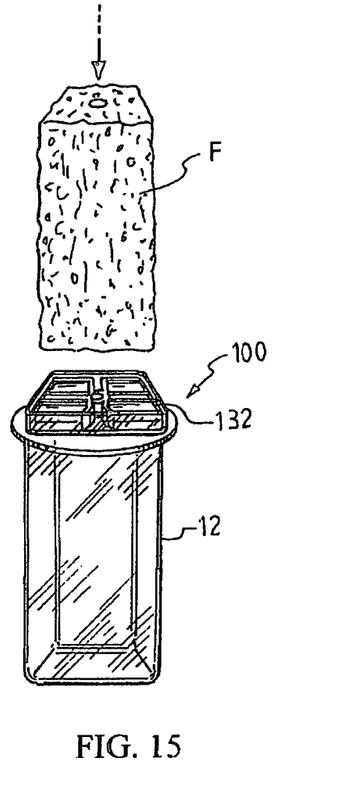
FIG. 15 is a perspective view of the device according to a further version of the embodiment of FIG. 11.

Also this embodiment provides, as the previous one, two realization versions, the one provided for housing and grating two slats F1 and F2 of cheese (FIGS. 11-14), the other provided for housing a single block F of cheese (FIG. 15).

The following description is made for convenience with reference to the first version, keeping in mind that the same structure and operation principle can be applied to the second version of this embodiment.

The device 100 according to the second embodiment comprises a thrusting plate 132 of deformable material, preferably plastic, having a single slot 150 which extends radially from the nut screw 34.

Preferably the slot 150 is passing on a side of the plate 132, i.e., it extends from the peripheral edge to the nut screw 134, and it forms, also in this case, two parts 132a, 132b.

From the opposite part with respect to the slot 150, a slit 132' is made in the plate 132, which extends from the edge to the nut screw 134 and which defines two driving tines 151.

It is to be noted that in the plate 132, in correspondence with the nut screw 134 a soft small bridge 132" is present, which normally keeps the nut screw 134 shaped in the "C"-like configuration screwed on the stem 130.

The soft small bridge 132" also allows, thanks to its own elasticity and by means of manual activation mutually approaching the tines 151, to open the nut screw 134 until it reaches a more open "C"-like shape, substantially almost in the "U" shape.

Preferably the slit 132' is reamed and each tine 151 comprises a bevel 152 for helping the mutual approaching of the tines themselves.

It is also to be noted that, in this embodiment, the slot 150 and the slit 132' are aligned and they thus also perform a function similar to that taken by the notches 42 of the previous embodiment. They in fact allow the introduction and the passage of the baffles 40 (FIG. 13) arranged inside the container 12.

Figures 13, 14:
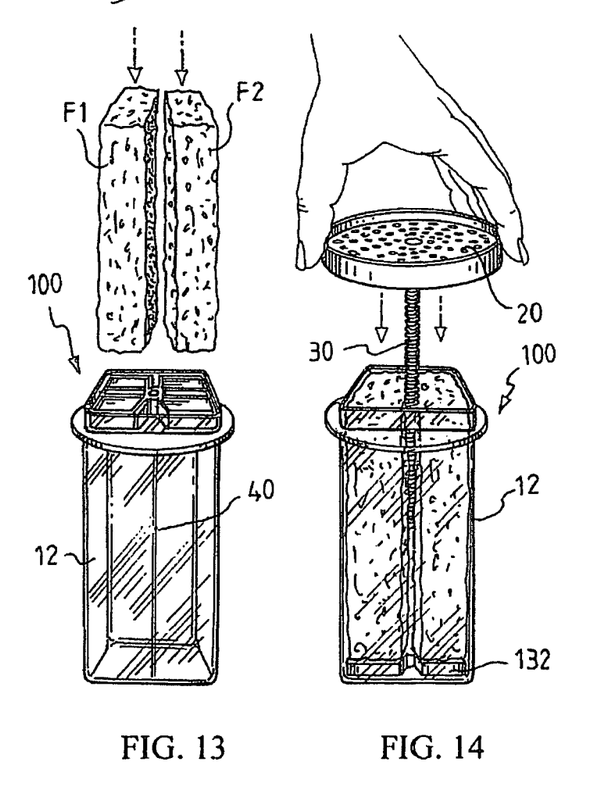
FIG. 13 is a perspective view of the device according to the embodiment of FIG. 11, during a refilling operation.
FIG. 14 is a perspective view of the device according to the embodiment of FIG. 11, during a closing operation once the refill has occurred.

In this way, a single plate 132 can be used both for the first version of FIG. 13 for the two slats of cheese F1 and F2, and for the second version of FIG. 15 for he block of cheese F.

The opening, refilling and closing operations of the device according to this second embodiment are the following.

When the product to be grated is finished the plate 132 is in a stroke end position near the grater-like disk 20.

Figure 11:
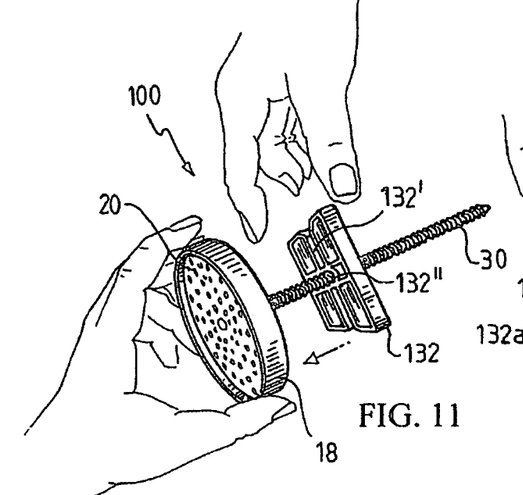
FIG. 11 is a perspective view of a portion of the device according to a second embodiment, in an opening configuration.

In the stroke end position, the grate-like disk 20 is removed from the container 12 together with the plate 132, since the nut screw 134 is closed in the "C" shape and it is tied to the stem 30 (FIG. 11).

Subsequently, by manually acting on the two tines 151, the nut screw 134 is open passing from the "C"-like configuration to the open "U"-shaped configuration.

Figure 12:
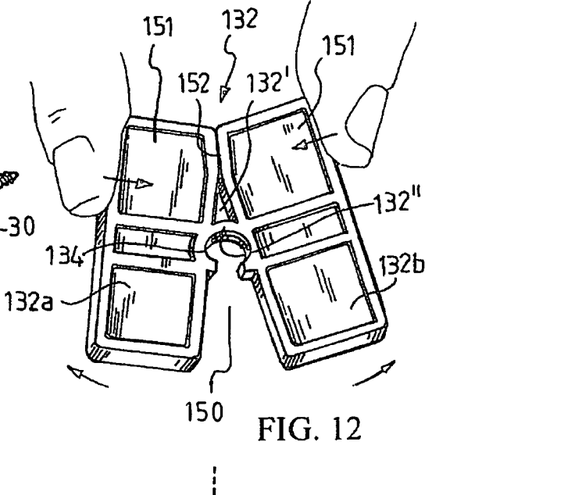
FIG. 12 is an enlarged view of a detail of the device of FIG. 11.

In this latter configuration the engagement of its threading on the stem 30 fails (FIG. 12). The uncoupling of the grater-like disk 20 from the plate 132 is thus obtained.

At this point the refill of the product inside the container 12 is possible as shown in FIG. 13.

In practice, the plate 132 is placed on the mouth of the container 12 and, in a similar way to what has been said for the first embodiment, the introduction of the two blocks of cheese F1, F2 (FIG. 14), or of a single block F (FIG. 15), determines the withdrawal of the plate 132 to the proximity of the bottom of the container body 12.

In this step it is thus possible to perform the re-closing of the device by introducing the threaded stem 30 until the nut screw 34 is screwed.

The cutting container device 100 is refilled again and the grinding and subsequent dispensing of the grated cheese can be restarted.

Advantageously, therefore, the cutting container device subject of the invention allows, as described, to perform a quick refill of the product for a multi-purpose thereof, although preserving a simple structure and a limited number of components.

Preferably, the component parts of the device are made of plastic material, in particular the glass-like container body 12 is realised with transparent plastic material for allowing the residual product thereinside to be seen. Also the cutting tool can be realised with plastic parts or, possibly, the sole disk 20 having the cutting tools can be realised with steel for an increased cutting reliability.

The device can also be used with different kinds of food products, such as blocks of hard cheese, dry bread, chocolate slats, vegetables, dry fruit, truffles, spices or other aromatic substances, which must be grated, ground, cut in the culinary preparations.

All of the above U.S. Patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention of claimed is:

1. A refillable cutting container device for blocks of food products to be dispensed in a grated, shredded or flake form, comprising:
   a container body suitable for receiving the food product in the form of one or more blocks;
   cutting means for the food product, coupled to the container body in correspondence with a mouth thereof;
   thrusting means for the food product, including a plate having a geometric shape complementary to a transverse cross-section of said container body and being arranged so as to rotate as a unit with said container body, the plate being provided with a threaded central opening; and
   a threaded stem for threaded engagement with the threaded central opening in the plate, the threaded stem being configured to rotate as a unit with said cutting means and to be axially oriented within the container body,
   said plate being capable of moving toward or away from the cutting means by threadedly translating with respect to the threaded stem when the container body and the cutting means are placed in relative rotation with respect to each other, thereby continuously pressing the food product against said cutting means up to a substantial exhaustion thereof, and characterised in that said plate has at least one slot which radially extends outward from the threaded central opening so as to allow an expansion of the threaded central opening for removing the threaded stem from the plate after use or engaging the threaded stem with the threaded central opening prior to use.

2. The device according to claim 1, characterised in that the plate comprises a pair of slots which radially extend from the threaded central opening so as to define at least two elastically approaching and opening wide apart parts of the plate, whereby the plate is susceptible of taking a shut configuration wherein the threaded central opening in the plate is engaged on the threaded stem so as move along the threaded stem when the plate is roated with respect thereto, or a wide apart configuration along the slots in such an extent as to widen said threaded central opening resulting in disengagement from the threaded stem allowing the free unthreading of the threaded stem from the threaded central opening and thus the separation of said cutting means from the plate.

3. The device according to claim 2 wherein interfering means are provided between said thrusting plate and said container body, suitable for thrusting the parts of the plate in to the shut configuration, the plate taking the wide apart configuration in a rest condition.

4. The device according to claim 3 wherein said interfering means between the thrusting plate and the container body include at least one pair of baffles inside the container body, each of them having a transverse extension reduced for a short longitudinal section near the mouth of the container body, and a respective pair of notches made in the thrusting plate, suitable for receiving said baffles, whereby, in an intermediate forwarding position of the plate along the threaded stem, the introduction of the baffles in the corresponding notches determines the mutual approaching of the parts of the plate in the shut configuration, whereas in a stroke end position the introduction of the baffle sections with transverse extension reduced in the corresponding notches determines the widening apart of the parts of the plate in the rest configuration.

5. The device according to claim 4 wherein said baffles have a pair of retaining tabs in the plane of the mouth of the container body, protruding with respect to the transverse extension of the baffle.

6. The device according to claim 3 wherein said interfering means between the thrusting plate and the container body include at least a pair of teeth projecting from the peripheral edge of the plate and a pair of corresponding openings made on opposite walls of the container body near the mouth thereof, suitable for receiving said teeth, whereby in an intermediate forwarding position of the plate along the threaded stem the interference of the teeth with the walls of the container body determines the mutual approaching of the walls of the plate in the shut configuration, whereas in a stroke end position the introduction of the teeth in the corresponding openings determines the widening apart of the parts of the plate in the rest configuration.

7. The device according to claim 1 wherein said cutting means include one of a cutting tool and a carving tool of the product housed within the container body, and supporting means of said tool which can be coupled in a removable way from the container body.

8. The device according to claim 7 wherein said supporting means comprise an annular frame suitable for receiving said cutting tool or carving tool of the product, which has tied a pair of coupling oscillating tabs having projections suitable for engaging on a corresponding flange integrally formed with the container body.

9. The device according to claim 7 wherein said cutting tool or carving tool of the product is a grater.

10. The device according to claim 7 wherein said cutting tool or carving tool of the product comprises at least one radial blade.

11. The device according to claim 1 wherein the plate comprises a single slot.

12. The device according to claim 11 wherein the slot is passing on a side of the thrusting plate from its peripheral edge up to the threaded central opening for dividing the plate into more than one parts.

13. The device according to claim 12 wherein the thrusting plate, in a side opposite with respect to the slot, comprises a slit.

14. The device according to claim 13 wherein the slit extends from a peripheral edge up to the threaded central opening so as to define two driving tines.

15. The device according to claim 14 wherein a soft small bridge is placed in correspondence with the threaded central opening.

16. The device according to claim 13 wherein the slit and the slot are aligned with one another.

17. The device according to claim 14 wherein the threaded central opening is expandable between a first state and a second state by an activation of the driving tines, wherein in the first state, the threaded central opening comprises a substantially arcuate cross-sectional shape for being engaged with to the threaded stem, and in the second state, the threaded central opening comprises a cross-sectional shape having a substantially "C"-shaped concavity.

18. The device according to claim 17, wherein in the second state, the threaded central opening comprises a cross-sectional shape having a substantially "U"-shaped concavity.

19. The device according to claim 14 wherein the slit is reamed, for helping a mutual approaching of the driving tines.

20. The device according to claim 14 wherein the driving tines comprise two bevels.

21. A refillable cutting container coupled to a cutting mechanism fixedly coupled with respect to a threaded stem to rotate as a unit therewith and configured for cutting blocks of food products thrust by a plate, the plate comprising:

a geometric shape configured to be placed complementary to a transverse cross-section of the container and configured to rotate as a unit with the container;

a threaded central opening for threaded engagement with the threaded stem, the plate being configured to translate with respect to the threaded stem toward or away from the cutting mechanism when the container and the cutting mechanism are placed in relative rotation with respect to each other, thereby continuously pressing the blocks of food against the cutting mechanism when in use; and at least one slot that radially extends outward from the threaded central opening so as to allow an expansion of the threaded central opening for removing the threaded stem from the plate after use or engaging the threaded stem with the threaded central opening prior to use.

22. The plate according to claim 21, further comprising a pair of slots which radially extend from the threaded central opening so as to define at least two elastically approaching and opening wide apart parts of the plate, wherein the plate can form a shut configuration allowing the plate to move along the threaded stem when the plate is rotated with respect thereto, or the plate can form a wide apart configuration along the slots whereby the threaded central opening can be widened and the cutting mechanism can be separated from the plate.

* * * * *